(12) United States Patent
Chang et al.

(10) Patent No.: US 6,359,773 B1
(45) Date of Patent: Mar. 19, 2002

(54) PORTABLE DATA PROCESSING DEVICE

(75) Inventors: Sung-Po Chang; Shih-Min Wang, both of Taipei (TW)

(73) Assignee: Inventec Corporation (TW)

( * ) Notice: Subject to any disclaimer, the term of this patent is extended or adjusted under 35 U.S.C. 154(b) by 7 days.

(21) Appl. No.: 09/644,672

(22) Filed: Aug. 24, 2000

(51) Int. Cl.⁷ .............................................. H05F 5/10
(52) U.S. Cl. ................... 361/680; 361/727; 361/683; 312/223.6; 235/375
(58) Field of Search ................. 361/680–687, 361/724–727; 312/223.1–223.6, 223.72; 348/551–553; 292/42, 148, 151, 307 R; D14/346; 206/45.23; 235/375

(56) References Cited

U.S. PATENT DOCUMENTS

| | | | | |
|---|---|---|---|---|
| 5,465,832 A | * | 11/1995 | Kennedy et al. | 206/45.23 |
| 6,102,284 A | * | 8/2000 | Myers et al. | 235/375 |
| 6,175,602 B1 | * | 1/2001 | Schaerer et al. | 361/680 |
| D448,765 S | * | 10/2001 | Cohen et al. | D14/346 |

* cited by examiner

Primary Examiner—Leo P. Picard
Assistant Examiner—Hung Van Duong

(57) ABSTRACT

The present invention relates to a portable data processing device comprising an exchanging mechanism for alternatively concealing the data processing device or the handle thereof. By means of the exchanging mechanism, the data processing device and the handle thereof can be alternatively exposed to the outside during the working status or portable status. In addition to the advantage of easy portability, the design that the data processing device and the handle thereof are accommodated within the same space is also advantageous of reducing the space occupied by the data processing device and protecting the data processing device in the portable status.

16 Claims, 6 Drawing Sheets

PORTABLE DATA PROCESSING DEVICE

BACKGROUND OF THE INVENTION

1. Field of Invention

The present invention is related to an improvement in the structure of portable data processing device and to provide a space-saving, easily utilized and carried design of the same, which can be applied to the portable data processing device such as notebook computer or the same.

2. Related Art

The current portable data processing device such as notebook computer is generally carried with a backpack. When in the working status, it is necessary to open the backpack to take out the data processing device therein; while in the portable status, it is necessary to reopen the backpack to put the data processing device therein. Such way of usage is not convenient to the users and fails to meet customers' demand of take-to-go and put-down-to-work. Even with the installation of a handle on the casing, it is not very satisfactory because in the working status the handle is left idled to occupy the space and has no other use.

SUMMARY OF THE INVENTION

It is the objective of the present invention to provide a portable data processing device characterized in comprising a data input device, a handle, and a mobile carrier device to slide back and forth within an accommodation portion of the casing. Because the data input device and the handle will never be simultaneously in use, in the working status the mobile carrier device can be adjusted to let the data input device reach out of the accommodation portion and the handle shrink into the same. By which the present invention can achieve the customer's demand of take-to-go and put-down-to-use.

Moreover, the mobile carrier device (or the casing) is equipped with at least one fixer to be opposite to at least one slot on the casing (or the mobile carrier device). By buckling up the fixer and the slot, the mobile carrier device can be fixed to the working position or portable position. There is at least one protruding portion installed on the mobile carrier device to be opposite to a sliding slot on the casing to define a sliding range for the mobile carrier device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
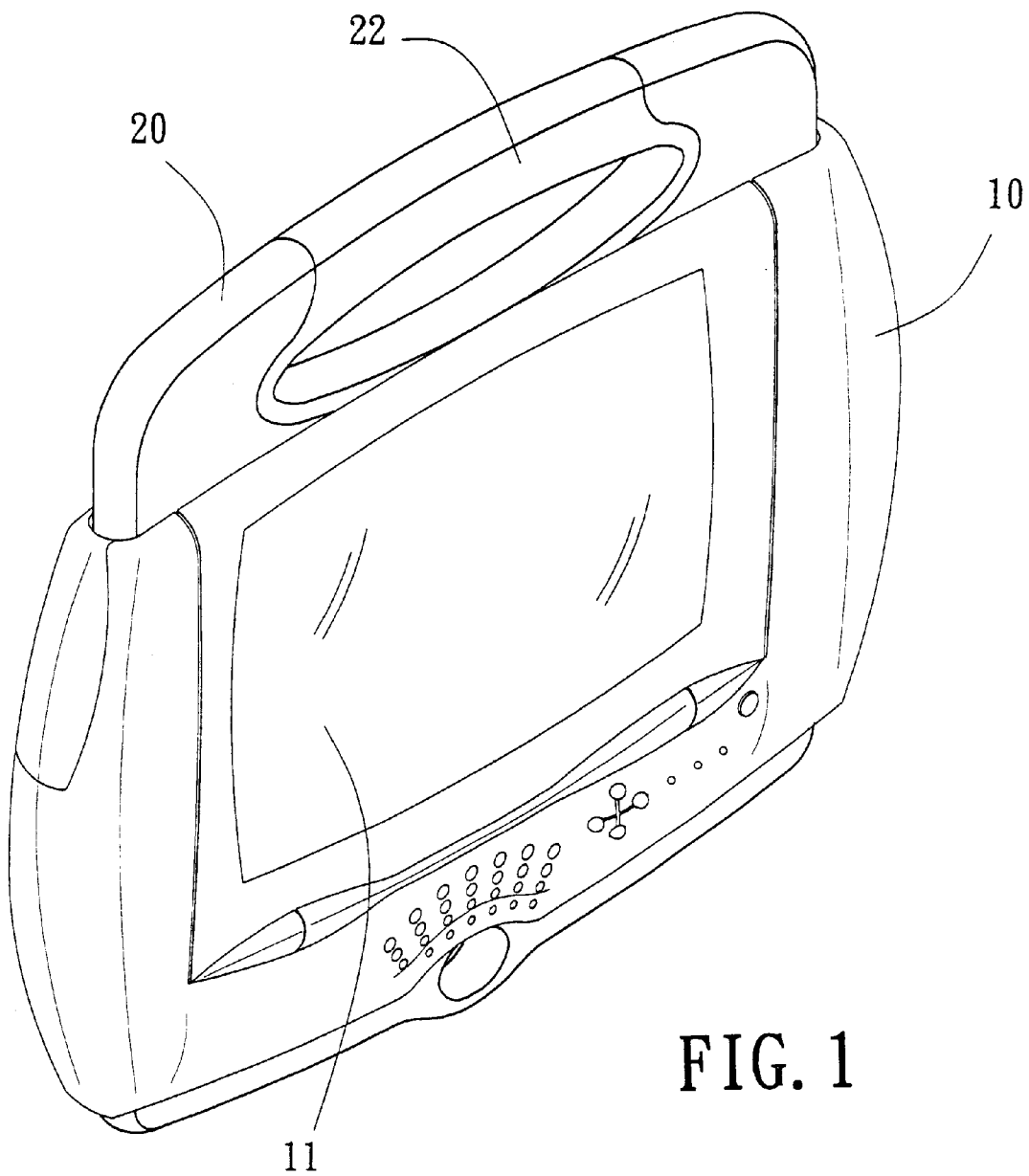
FIG. 1 is the assembled illustration of the portable data processing device according to the present invention.

Referring now to FIG. 1, The portable data processing device as disclosed in the present invention consists of a monitor, a data processing unit, and a data processing device, which is characterized in comprising an exchanging mechanism for alternatively concealing the data processing device or the handle thereof. The exchanging mechanism further comprises a casing 10 with an accommodation portion penetrating therethrough, and a mobile carrier device 20 with a data input device to receive the data from the users on one end and a handle for the users to hold on the other end. The mobile carrier device is slidably installed within the accommodation portion of the casing 10 and held by a supporting plane located within the casing.

Figure 2:
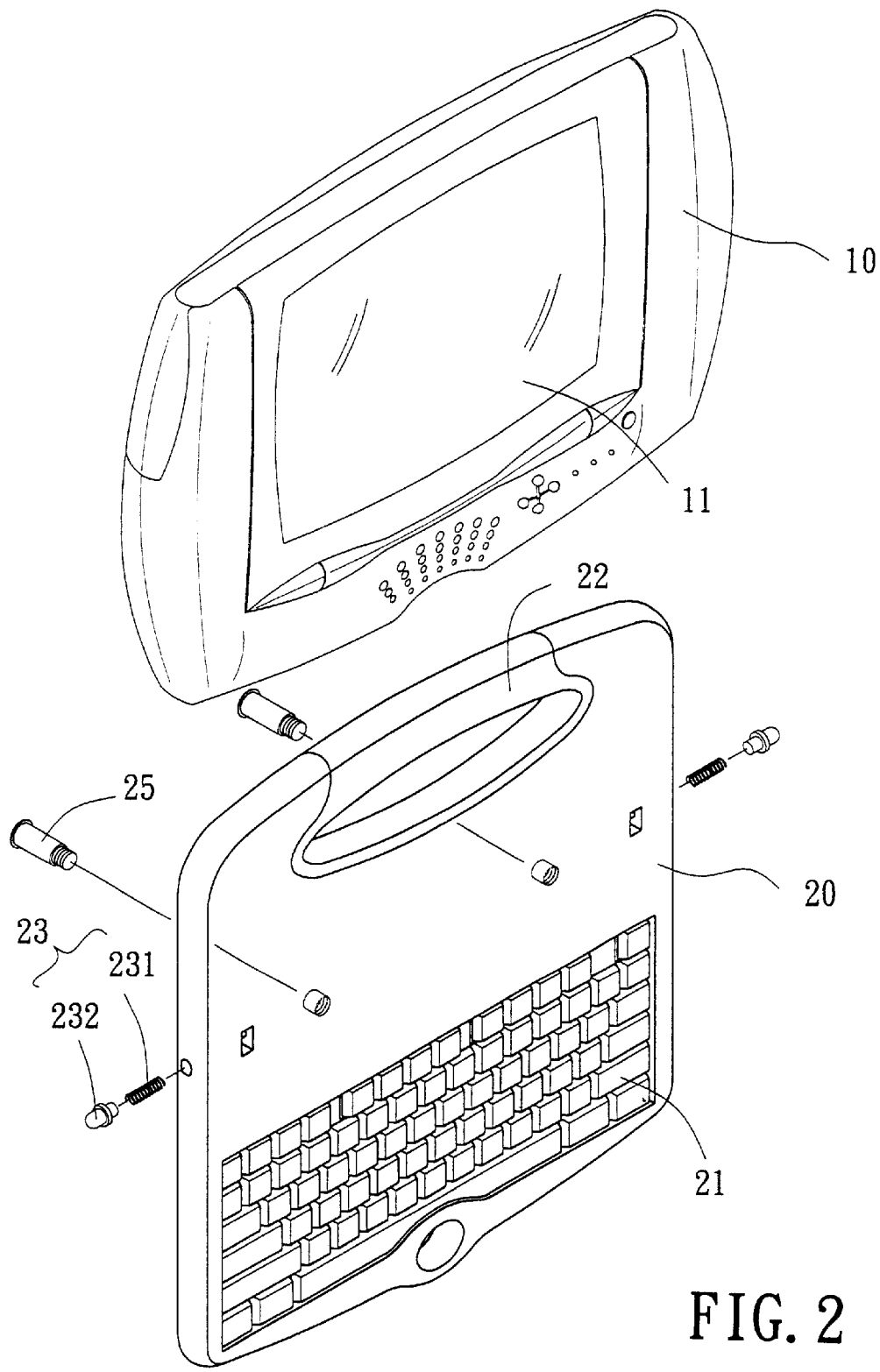
FIG. 2 is the exploded illustration of the portable data processing device according to the present invention.

Please refer to FIG. 2, the exploded illustration of the portable data processing device according to the present invention. The mobile carrier device 20 comprises a data input device 21 on one end for receiving the data given by the users and a handle 22 on the other end for the users to hold and carry. Because the data input device 21 and the handle 22 will not in use simultaneously, the mobile carrier device 20 can be adjusted to let the data input device 21 reach out of the accommodation portion and the handle 22 shrink into the same. While the device is converted to the portable status, the process is reversed to let the handle 22 reach out of the accommodation portion and the data input device 21 shrink into the same.

The mobile carrier device 20 further comprises a fixer 23 and a slot opposite to the fixer on the casing. By buckling the fixer and the slot, the mobile carrier device 20 can be fixed to a working position or a portable position.

The protruding portion 25 on the mobile carrier device 20 can slide against a guide track on the casing to define the sliding range for the mobile carrier device 20.

The fixer 23 is consisted of a resilient member 231 and a bolt 232. When the fixer 23 and the slot are buckled together, the mobile carrier device 20 can be pulled to compress the resilient member 231 to force the bolt 232 to be moved away from the opposite slot. When the fixer 23 is approaching the slot, the bolt 232 is induced into the slot by the stretching of the resilient member 231 to buckle up the fixer 23 and the slot. Thereby the mobile carrier device 20 can be fixed to the working position or the portable position.

Figure 3A:
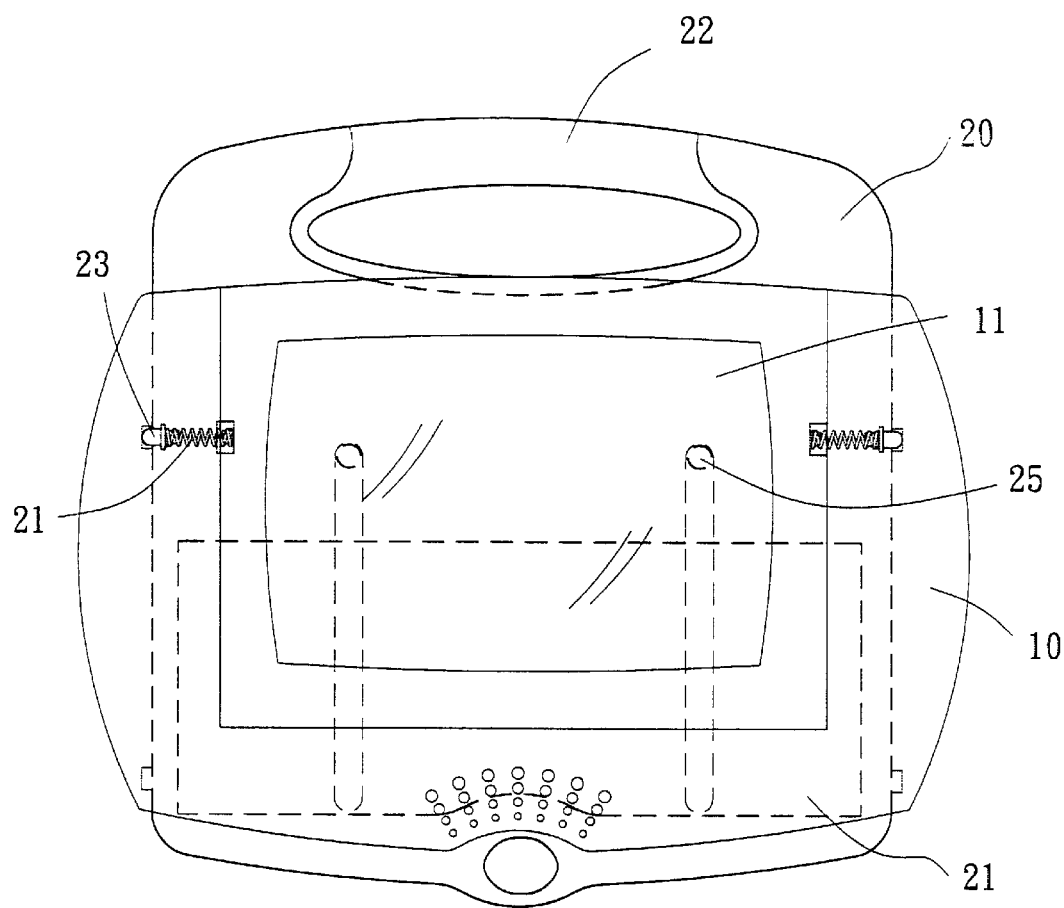
FIGS. 3A and 3B is the structural illustration of the portable data processing device according to the present invention.

Referring to FIG. 3, FIG. 3A depicts the structural diagram of the present invention in the portable status, wherein the mobile carrier device 20 is adjusted to let the data input device 21 shrink into the accommodation portion and the handle 22 reach out of the same. The mobile carrier device 20 can be fixed to the portable status by buckling up the fixer 23 on the mobile carrier device 20 and the opposite slot on the casing 10.

Figure 3B:
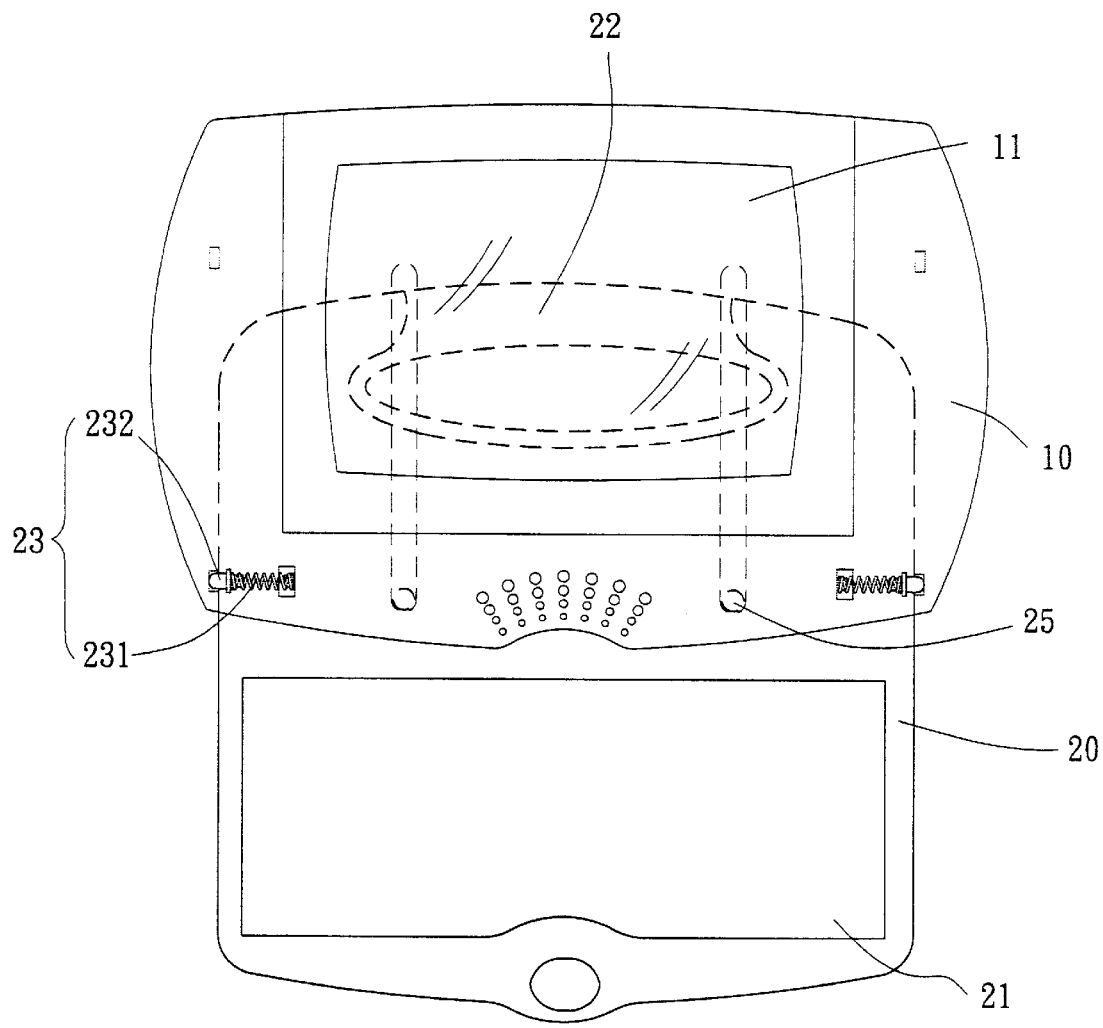

FIG. 3B depicts the structural diagram of the present invention in the working status, wherein the mobile carrier device 20 is moved to let the data input device 21 reach out of the accommodation portion and the handle 22 shrink into the same. The mobile carrier device 20 can be fixed to the working status by buckling up the fixer 23 on the mobile carrier device 20 and the opposite slot on the casing 10.

Figure 4:
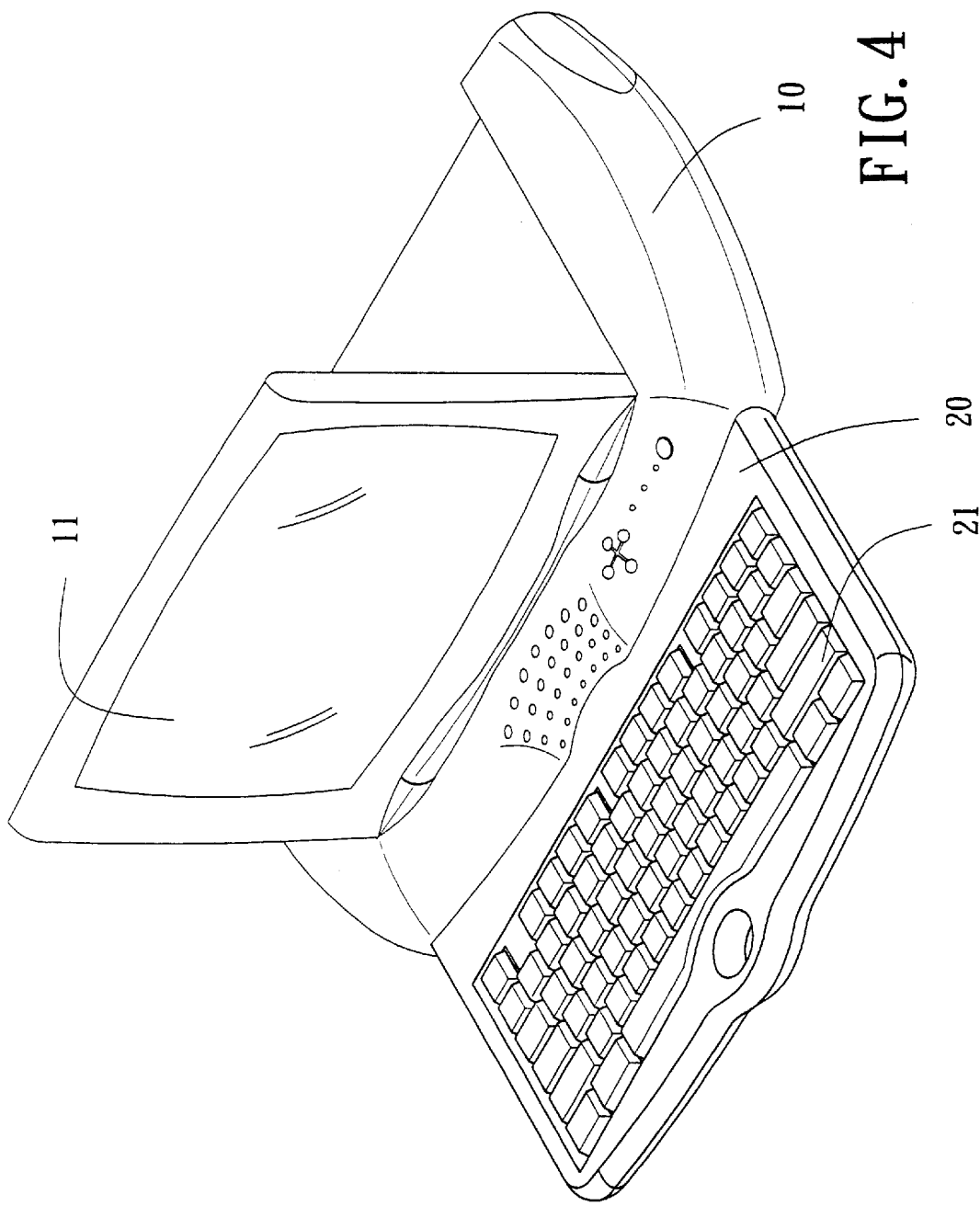
FIG. 4 is an illustrated embodiment of the portable data processing device according to the present invention, wherein a monitor is pivoted to the casing.
Figure 5:
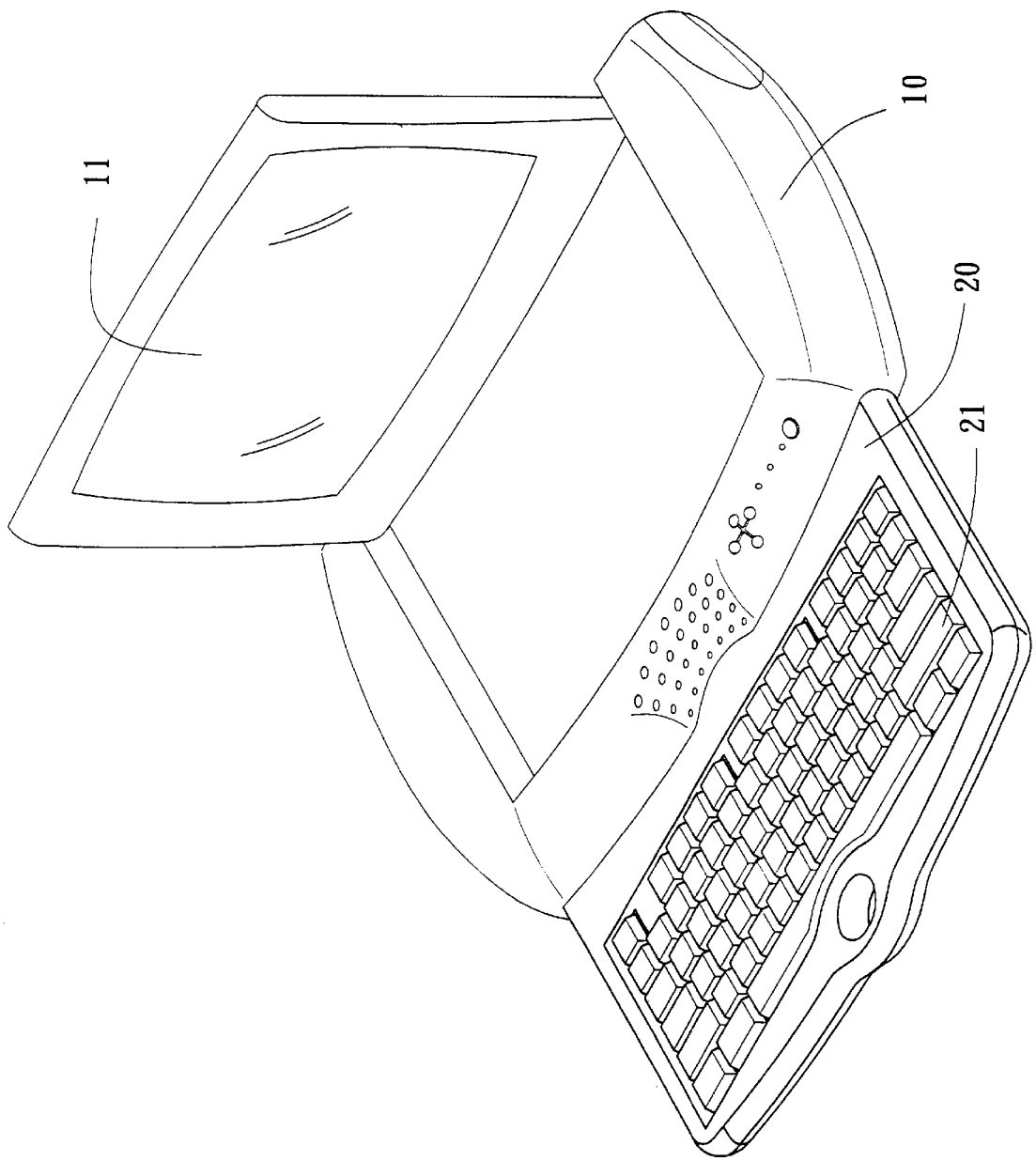
FIG. 5 is an illustrated embodiment, where a monitor is pivoted to the casing.

A preferred embodiment of the portable data processing device according to the present invention is depicted as referring to FIG. 4, wherein a monitor 10 is moveably pivoted to the casing 10.

To sum up, the present invention is a portable data processing device comprising a mobile carrier device incorporating the functions of data input device and the handle, which can be adapted to the working status or the portable one and is advantageous of space-sparing, easy-to-use and convenient-to-carry.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable data processing device consisted of a monitor, a processing unit, and a data input device with a handle characterized in comprising an exchanging mechanism for alternatively concealing said data input device in a portable position and said handle in a working position, wherein said exchanging mechanism further comprises:

a casing with an accommodation portion penetrating therethrough and a supporting plane; and a mobile carrier device which is moveably installed within an accommodation portion of said casing and can slide back and forth against said supporting plane with said data input device for receiving the data given by the users installed on one end thereof and said handle for the users to hold and carry installed on the other end thereof, wherein in said working position said data input device reaches out of said accommodation portion and said handle shrinks into the same and in said portable position said data input device shrinks into said accommodation portion and said handle reaches out of the same.

2. The portable data processing device as disclosed in the claim 1, wherein said portable data processing device further comprises a fixer on said mobile carrier device and a slot opposite to said fixer on said casing to buckle up said fixer to hold said mobile carrier device in said working position.

3. The portable data processing device as disclosed in the claim 1, wherein said portable data processing device further comprises a fixer on said casing and a slot opposite to said fixer on said mobile carrier device to buckle up said fixer and hold said mobile carrier device in said working position.

4. The portable data processing device as disclosed in the claim 1, wherein said portable data processing device further comprises a fixer on said moveable carrier device and a slot opposite to said fixer on said casing to buckle up said fixer and hold said mobile carrier device in said portable position.

5. The portable data processing device as disclosed in the claim 1, wherein said portable data processing device further comprises a fixer on said casing and a slot opposite to said fixer on said mobile carrier device to buckle up said fixer and hold said mobile carrier device in said portable position.

6. The portable data processing device as disclosed in the claim 1, wherein said portable data processing device further comprises a protruding portion on said mobile carrier device and a guide track opposite to said protruding portion on said casing to define the sliding range for said mobile carrier device.

7. The portable data processing device as disclosed in the claim 1, wherein said monitor is moveably pivoted to said casing.

8. The portable data processing device as disclosed in the claim 2, wherein said fixer on said mobile carrier device comprises a bolt and a resilient member to bear against said bolt in said slot.

9. The portable data processing device as disclosed in the claim 3, wherein said fixer on said mobile carrier device comprises a bolt and a resilient member to bear against said bolt in said slot.

10. The portable data processing device as disclosed in the claim 4, wherein said fixer on said mobile carrier device comprises a bolt and a resilient member to bear against said bolt in said slot.

11. The portable data processing device as disclosed in the claim 5, wherein said fixer on said mobile carrier device comprises a bolt and a resilient member to bear against said bolt in said slot.

12. The portable data processing device as disclosed in the claim 6, wherein said protruding portion on said mobile carrier device is a screw.

13. The portable data processing device as disclosed in the claim 8, wherein said resilient member is a spring.

14. The portable data processing device as disclosed in the claim 9, wherein said resilient member is a spring.

15. The portable data processing device as disclosed in the claim 10, wherein said resilient member is a spring.

16. The portable data processing device as disclosed in the claim 11, wherein said resilient member is a spring.

* * * * *